Patented July 7, 1942

2,288,686

UNITED STATES PATENT OFFICE 2,288,686

RUBBER AND CORK PRODUCT

Claude H. Daniels, Greenwich, Conn.

No Drawing. Application March 2, 1937,
Serial No. 128,649

3 Claims. (Cl. 260—723)

This invention relates to improvements in a rubber compound, products derived therefrom and the method of making the same.

There is a demand in certain fields for a product composed at least in part of rubber so as to have, to some degree, certain characteristics of rubber such as resiliency, but which will be lighter in weight and less expensive than solid rubber. These features may be obtained by spongy, porous or cellular structure or by the addition of a filler which is lighter than rubber. Former methods of making sponge rubber have been expensive and complicated and it has also been found to be difficult to combine a large percentage of a filler with the rubber and obtain a uniform structure as the filler, particularly when of a class which tends to float in water, will not remain in suspension when mixed in to a liquid dispersion of rubber.

It is an object of my invention to disclose a compound of rubber and a filler which may be used while in a plastic, pasty state as a filling compound for irregular cavities or which may be dried into sheets or other shapes for use as a substitute for rubber in various fields such as padding for clothing, hatbands, foot supports, cushions for sockets of artificial limbs, gaskets or the like.

It is further an object of my invention to disclose a compound consisting of rubber and a finely divided filler in which the percentage of filler is greater than that of the rubber and which, when in a pasty state, is capable of drying to a final product which is cellular in character and has to some extent the cushiony, resilient characteristic of rubber.

According to my invention the filler, which may be any light material in a finely divided state such as shredded cork, is added to a liquid dispersion of rubber such as latex which has been stirred, beaten or whipped, whereby a relatively large percentage of filler may be added and maintained in substantially uniform suspension as the rubber coagulates upon drying.

A liquid dispersion of rubber such as latex when rapidly stirred, beaten or whipped will increase in volume to a considerable extent, up to for example 100 per cent or more. The increase in volume is due to the occlusion or incorporation of air into the mixture and is dependent to some extent upon the percentage of the diluent, such as water. Refined latex for example is composed of 40% water and 60% rubber and may be whipped to increase in volume over 100%. If, however, it is attempted to dry the mixture after whipping it will be found that the air bubbles will not be retained in suspension but will rise to the top and the dried product will not have a uniform cellular structure. Sponge rubber can therefore not be made by merely beating air into latex and then drying.

It is desirable to combine an inexpensive filler with rubber. If, however, it is attempted to add a finely divided filler such as cork to latex, without first whipping the latex, it will be found that the cork will rise to the top as the mixture is dried and a uniform final product cannot be obtained.

I have found that by first beating or whipping the latex and then adding the filler thereto that upon subsequent drying the air bubbles and the filler will be retained in suspension and a uniform final product will be obtained.

The filler should be added and stirred into the mixture until a pasty composition is obtained which may be laid in cavities when used as a filling material or may be spread in pans for drying into sheets. The proportion of filler which should be added is therefore determined approximately by the increase in volume of the latex by the beating of air thereinto. More filler may be added if more air is beaten into the mix. The character of the final product is modified according to the relative proportions of rubber and filler. If a relatively hard or solid product is desired less air is beaten into the latex and a smaller percentage of filler is added. I prefer, however, to increase the volume of the latex at least 25% and to obtain a final product in which the filler is present in a proportion of at least 50%. The latex may be beaten to increase its volume over 100% or more by further diluting the latex with water and a considerably larger amount of filler must then be added to obtain a pasty composition. Such a compound when dried will be found to be relatively light in weight, cellular in structure and capable of receiving and retaining an impression. If, for example, a sheet of this material is pressed with the finger the impression will remain after removal of the finger.

The filler used should be of a class which, at least when in a finely divided state, floats in water such as shredded cork or the like. Due to its lightness, I have found that shredded cork is a desirable filler for many purposes. The particles may range in size between that which will be retained by a 70 mesh screen and that which will pass a 10 mesh screen, although smaller or larger particles of cork may be found to be suitable for special purposes. The larger the particles of filler the larger the air cells will be.

For the liquid dispersion of rubber, refined latex has been found to be suitable since the proteins and fats have been removed and the molecules of rubber unite more readily than is the case with normal latex. However, normal latex or other liquid dispersions of rubber may also be employed. For example, cured rubber could be reduced to a liquid dispersion by a solvent such as carbon bisulphide, chloroform, benzine, gasoline or the like. Furthermore, for certain purposes it is desired to obtain a rubber product that will be more resistant to the effect of heat or the action of oils and greases. In such case I have found that synthetic rubber, such as that obtained from acetylene or the like, is particularly suitable. Synthetic rubber of this character when combined with a filler such as asbestos provides a product that is highly resistant to the effect of heat and lubricants and is a suitable material for gaskets.

The compound prepared as above described in a pasty form is either laid directly in cavities where it is allowed to dry, or it is spread in pans, the top surface being leveled off to obtain sheets of substantially uniform thickness as the material is allowed to dry. If more rapid drying is desired, the pans with the pasty rubber compound are placed in a heater at a temperature of approximately 120° F. The product is thus obtained in sheets from which pieces of suitable size may be cut. If sheets of more uniform thickness are desired with a smoother top surface, the sheets, when of the type which will receive and retain impressions, may be pressed between flat plates thereby partially compressing the product by reducing the size of the air cells and resulting in smooth surfaced uniform thickness sheets which, however, are still capable of further compression so as to receive and retain impressions.

In the practice of my invention there is a considerable range in the relative proportions of rubber and filler and in the relative porosity or percentage of air cells in the product with corresponding variations in the physical characteristics of the product. Considering only the rubber and the filler, I have found that for the best results the rubber should not be greater than 35% and the filler not less than 65% by volume. Also, the rubber should not be less than 10% and the filler not greater than 90%. The porosity or the ratio of the interstices or air cells to the mass of rubber and filler increases as the proportion of rubber is decreased, and the proportion of filler is increased. The porosity should not be less than 10% or more than 20% of the total volume of the product.

In making a product that will be cushiony or somewhat resilient but which will not retain an impression when compressed, I have taken one part of refined latex which is stirred to increase in volume about 25% as air is incorporated. An equal amount of filler such as shredded cork is then mixed in until a pasty composition is obtained which is capable of drying. In this example the rubber amounts to 0.6 part and the filler 1.25 parts or 32.4% rubber and 67.6% filler by volume of the solid material of the product. The air which is added by stirring amounts to about 11.9% by volume of the fully dried product.

I have found that a product will be obtained which will retain an impression when compressed by beating one part of refined latex to increase its volume about 100% to which is added four parts of finely divided filler such as shredded cork, to obtain a pasty composition. In this example the rubber amounts to approximately 13% and the filler 87% by volume of the product after the water is removed by drying. The air cells in this product will constitute substantially 17.8% of the total volume.

The product of the second example will be considerably lighter in weight per unit of volume than the first example due to the larger proportion of filler and the larger percentage of air cells.

I claim:

1. A product consisting of rubber, a finely divided cork filler uniformly distributed in amount greater than the rubber and uniformly distributed relatively small size air cells, said product being capable of receiving and retaining an impression.

2. A cellular sheet of rubber and a finely divided cork filler capable of receiving and retaining an impression.

3. A composition of matter consisting of a mixture of rubber and cork, the rubber consisting of refined latex and constituting 10% to 35% by volume, the cork comprising shredded cork evenly distributed throughout the product constituting between 90% and 65% by volume of the product, and the said product including finely divided air cells evenly distributed throughout the body thereof constituting between 10% and 20% by volume of the product, the product having the appearance of sponge rubber but being relatively lighter in weight and having the characteristic of deformation under pressure, which deformation is substantially retained when the pressure is removed, whereby the product may be used in a similar manner to moldable material in receiving and retaining an impression.

CLAUDE H. DANIELS.